United States Patent [19]

Furuta

[11] Patent Number: 5,396,295
[45] Date of Patent: Mar. 7, 1995

[54] PHASE CONTROL CIRCUIT FOR CONTROLLING PHASE OF VIDEO SIGNAL AND SAMPLING CLOCK SIGNAL

[75] Inventor: Satoshi Furuta, Yamanashi, Japan

[73] Assignee: Fanuc Ltd., Yamanashi, Japan

[21] Appl. No.: 108,610

[22] PCT Filed: Jan. 12, 1993

[86] PCT No.: PCT/JP93/00033

§ 371 Date: Aug. 31, 1993

§ 102(e) Date: Aug. 31, 1993

[87] PCT Pub. No.: WO93/15498

PCT Pub. Date: Aug. 5, 1993

[30] Foreign Application Priority Data

Jan. 23, 1992 [JP] Japan ............... 4-009668

[51] Int. Cl.$^6$ .............................................. H04N 5/04
[52] U.S. Cl. ..................................... 348/537; 375/374
[58] Field of Search ........................ 348/536, 500, 537;
375/119, 120, 118; H04N 7/15, 5/04, 5/12;
358/148, 158

[56] References Cited

U.S. PATENT DOCUMENTS

| 4,385,395 | 5/1983 | Tanaka et al. | 375/119 |
| 4,757,264 | 7/1988 | Lee et al. | 348/537 |
| 4,814,879 | 3/1989 | McNeely | 348/537 |
| 4,864,401 | 9/1989 | Kawata et al. | 348/537 |
| 4,893,319 | 1/1990 | Ziuchkovski | 348/537 |
| 5,012,339 | 4/1991 | Kurata et al. | 348/500 |
| 5,245,637 | 9/1993 | Gersbach et al. | 375/119 |

FOREIGN PATENT DOCUMENTS

| 0006985 | 1/1985 | Japan . |
| 0122688 | 6/1986 | Japan . |
| 0150970 | 7/1987 | Japan . |
| 0237689 | 9/1989 | Japan . |
| 0130593 | 5/1990 | Japan . |

Primary Examiner—James J. Groody
Assistant Examiner—David E. Harvey
Attorney, Agent, or Firm—Staas & Halsey

[57] ABSTRACT

A phase control circuit, which can be operated easily, automatically controls the phase of a video signal and a sampling clock signal. A delay circuit (24) outputs delayed clock pulses (DP) that are out of phase with each other, and switching circuits (25a~25c) select one, at a time, of the delayed clock pulses (DP) that are out of phase with each other in response to respective switching signals (SS1~SS3) from a control circuit (23), Counters (28a~28c) count pixel data (ED) latched by data latch circuits (26a~26c) each time the delayed clock pulses (DP) are outputted by the corresponding switching circuits (25a~25c), The control circuit (23) confirms the counts of the counters in each frame period, and controls a switching circuit (25d) to select a clock pulse in phase with the delayed clock pulse (DP) from the switching circuit (25b) and output the selected clock pulse to a panel display unit all the counts are equal to or greater than the count of the counter (28b) first sampling screen pattern.

3 Claims, 4 Drawing Sheets

PHASE CONTROL CIRCUIT FOR CONTROLLING PHASE OF VIDEO SIGNAL AND SAMPLING CLOCK SIGNAL

TECHNICAL FIELD

The present invention relates to a phase control circuit for controlling the phase of a video signal and a sampling clock signal, and more particularly to a video signal phase control circuit for use in a device, such as a panel display unit, which samples pixel information as one-bit data.

BACKGROUND ART

When transmitting a video signal of an image from a transmitting device to a display unit, it is customary to transmit, together with pixel data, a horizontal synchronizing signal and a vertical synchronizing signal to the display unit in synchronism with clock pulses. If the display unit comprises a CRT, then the frequency and phase of a sawtooth wave that is required to deflect an electron beam in the CRT are controlled on the basis of the horizontal and vertical synchronizing signals to scan the electron beam on the bulb face of the CRT in exactly the same manner that the image has been scanned in the transmitting device.

Recent years have seen the use of thin panel display units in place of conventional display units in the form of CRTs. The panel display units include a liquid-crystal display unit, a plasma display unit, and an EL display unit among others. The panel display units have X and Y electrodes crossing each other. When a voltage is applied to selected X and Y electrodes, light is emitted from the points of intersection of those X and Y electrodes to which the voltage is applied. To supply a video signal from a transmitting device to such a panel display unit, each bit of pixel data is synchronized with a sampling clock pulse on the transmitting device, and supplied, together with horizontal and vertical synchronizing signals, to the panel display unit.

When the panel display unit receives the supplied video signal, it effects horizontal and vertical synchronization of the received video signal, reproduces a sampling clock signal at the same frequency as that of the sampling clock signal on the transmitting device, synchronizes each bit of pixel data generated from the video signal with a sampling clock pulse, and displays the pixel data on a display screen.

For accurately introducing pixel data bit by bit, it is necessary to generate a sampling clock pulse substantially at the center of each bit pulse of the pixel data. However, only the horizontal and vertical synchronization fails to bring the center of each bit pulse into accurate phase with a sampling clock pulse though the periods of these pulses may be synchronized with each other. For this reason, the pixel data may not accurately be latched. The center of each bit pulse tends to be easily shifted out of phase with a sampling clock pulse in a numerical control system or the like which employs a panel display unit because the panel display unit is usually positioned remotely from a transmitting device in the numerical control system.

Heretofore, it has been customary for the panel display unit to be equipped with a .manual phase control device for shifting the phase of sampling clock pulses stepwise. The manual phase control device is manually adjusted to shift the sampling clock pulses into phase with pixel data.

In some applications where a panel display unit with a manual phase control device is combined with a system in a factory such as a numerical control system, since the system is assembled in installations that may change frequently, the length of the cable which interconnects the transmitting device and the panel display unit may also vary depending on the equipment with which the system associated. Each time the length of the cable which interconnects the transmitting device and the panel display unit varies, the transmitting device and the panel display unit are brought into a different phase relationship, causing the operator to manually adjust the manual phase control device for keeping the transmitting device and the panel display unit in phase with each other. Therefore, the manual phase control device has been complex and inefficient to operate.

DISCLOSURE OF THE INVENTION

In view of the aforesaid difficulties of the conventional phase control device, it is an object of the present invention to provide a phase control circuit capable of automatically controlling the phase of a video signal.

To achieve the above object, there is provided in accordance with the present invention a phase control circuit for controlling the phase of a video signal and a sampling clock signal, comprising sampling clock pulse output means for outputting a plurality of sampling clock pulses which are out of phase with each other, a plurality of sampling clock pulse switching means for selecting and outputting respective sampling clock pulses which are out of phase with each other from said plurality of sampling clock pulses each time a switching signal is supplied thereto, video sampling clock pulse output means for selecting one, at a time, of said plurality of sampling clock pulses and outputting the selected sampling clock pulse as a video sampling clock pulse to a display unit based on a video sampling clock pulse determining signal, a plurality of pixel data holding means connected respectively to said plurality of sampling clock pulse switching means, for holding pixel data in response to said sampling clock pulses outputted by said sampling clock pulse switching means, respectively, a plurality of pixel data counting means for counting the pixel data held by said pixel data holding means, respectively, and phase control means for confirming counts produced by said pixel data counting means in each predetermined period, outputting said video sampling clock pulse determining signal to said video sampling clock pulse output means if all the counts are equal to or greater than a predetermined value, and outputting new switching signals to said sampling clock pulse switching means, respectively, if any one of the counts is not equal to or greater than the predetermined value.

The sampling clock pulse switching means select and output respective sampling clock pulses which are out phase with each other from the plurality of sampling clock pulses every time a switching signal is outputted from the phase control means. The pixel data holding means associated respectively with the sampling clock pulse switching means hold pixel data when the sampling clock pulses are outputted from the respective sampling clock pulse switching means. The pixel data held by the pixel data holding means are counted by the pixel data counting means. The phase control means confirms the counts in each frame period. If all the counts are equal to or greater than a predetermined value, then the phase control means supplies a video sampling clock pulse determining signal to the sampling clock pulse output means. The video sampling clock pulse output means selects one video sampling clock pulse from the plurality of sampling clock pulses supplied from the sampling clock pulse output means, and outputs the video sampling clock pulse to the display unit, which displays the pixel data in timed relationship to the video sampling clock pulse, If any one of the counts is not equal to or greater than the predetermined value, then the phase control means outputs switching signals to the respective sampling clock pulse switching means, Now, sampling clock pulses in new phase relationship are outputted from the respective sampling clock pulse switching means, and the pixel data are counted,

BEST MODE FOR CARRYING OUT THE INVENTION

An embodiment of the present invention will hereinafter be described with reference to the drawings.

Figure 2:
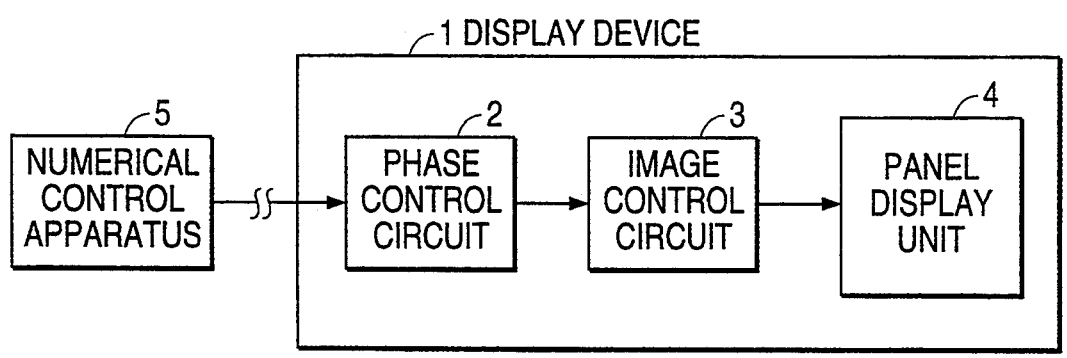
FIG. 2 is a block diagram of a display device which incorporates a phase control circuit according to an embodiment of the present invention.

FIG. 2 shows, in block form, a display device which incorporates a phase control circuit according to an embodiment of the present invention. In this embodiment, a display device 1 is combined with a numerical control system including a numerical control apparatus, and has a panel display unit 4 as its display screen. The display device 1 also has a phase control circuit 2 according to the present invention and an image control circuit 3. The phase control circuit 2 and the image control circuit 3 process a video signal transmitted from the numerical control apparatus 5, and the processed video signal is displayed on the panel display unit 4. The panel display unit 4 may comprise a liquid crystal display unit, a plasma display unit, an EL display unit, or the like.

Figure 1:
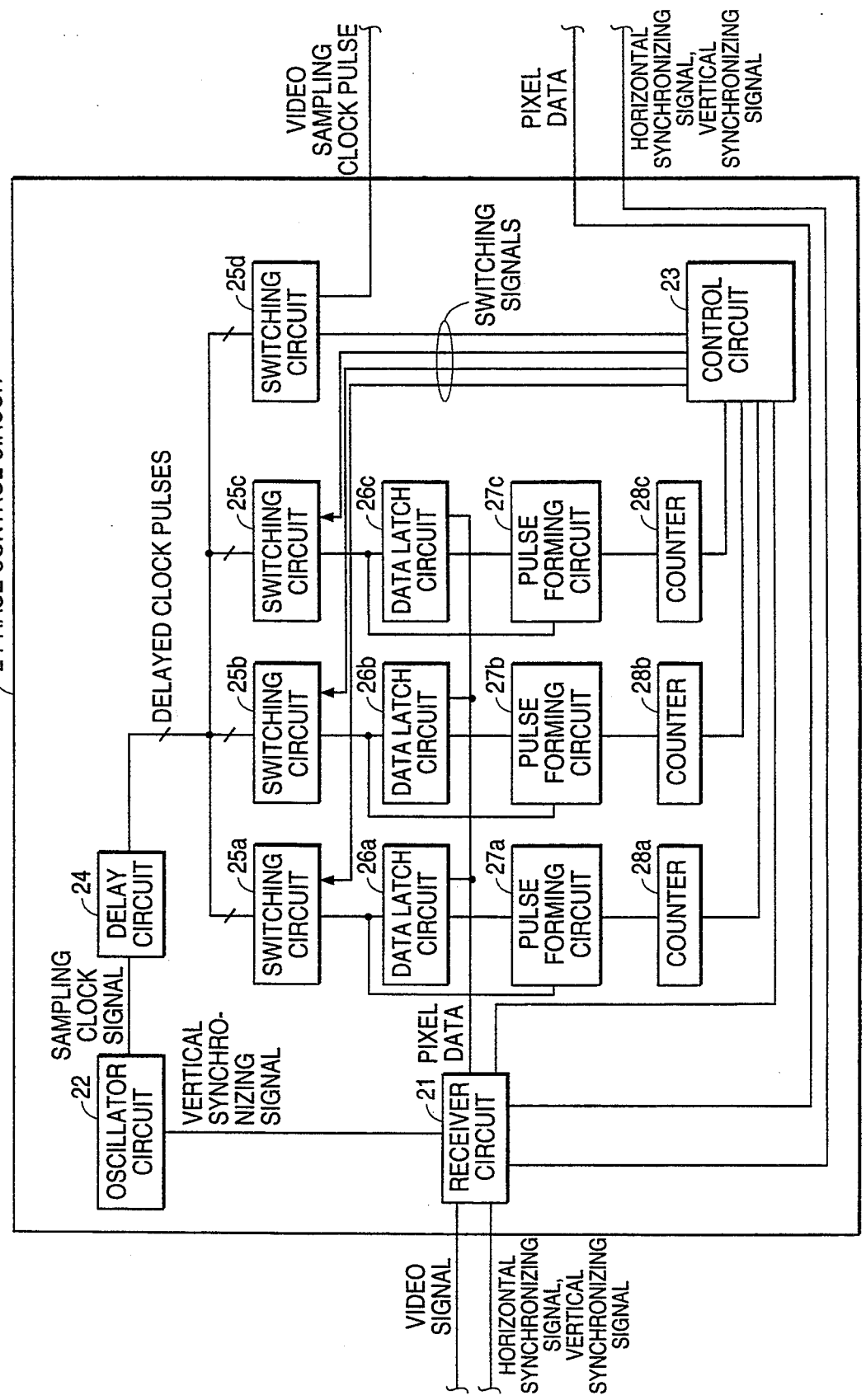
FIG. 1 is a block diagram of a phase control circuit according to the present invention.

FIG. 1 shows the phase control circuit 2 in block form. The phase control circuit 2 includes a receiver circuit 21 which is supplied from the numerical control apparatus 5 with a video signal VS containing pixel data ED, a horizontal synchronizing signal HD, and a vertical synchronizing signal VD. The receiver circuit 21 shapes the waveforms of the supplied signals and transmits these signals to the image control circuit 3, and also supplies the vertical synchronizing signal VD to an oscillator circuit 22 and a control circuit The receiver circuit 21 also supplies the pixel data ED to data latch circuits (DL) 26a~26c. In the illustrated embodiment, the display device 1 handles monochromatic images, and hence the pixel data ED is in the form of a one-dot pulse signal.

Figure 3:
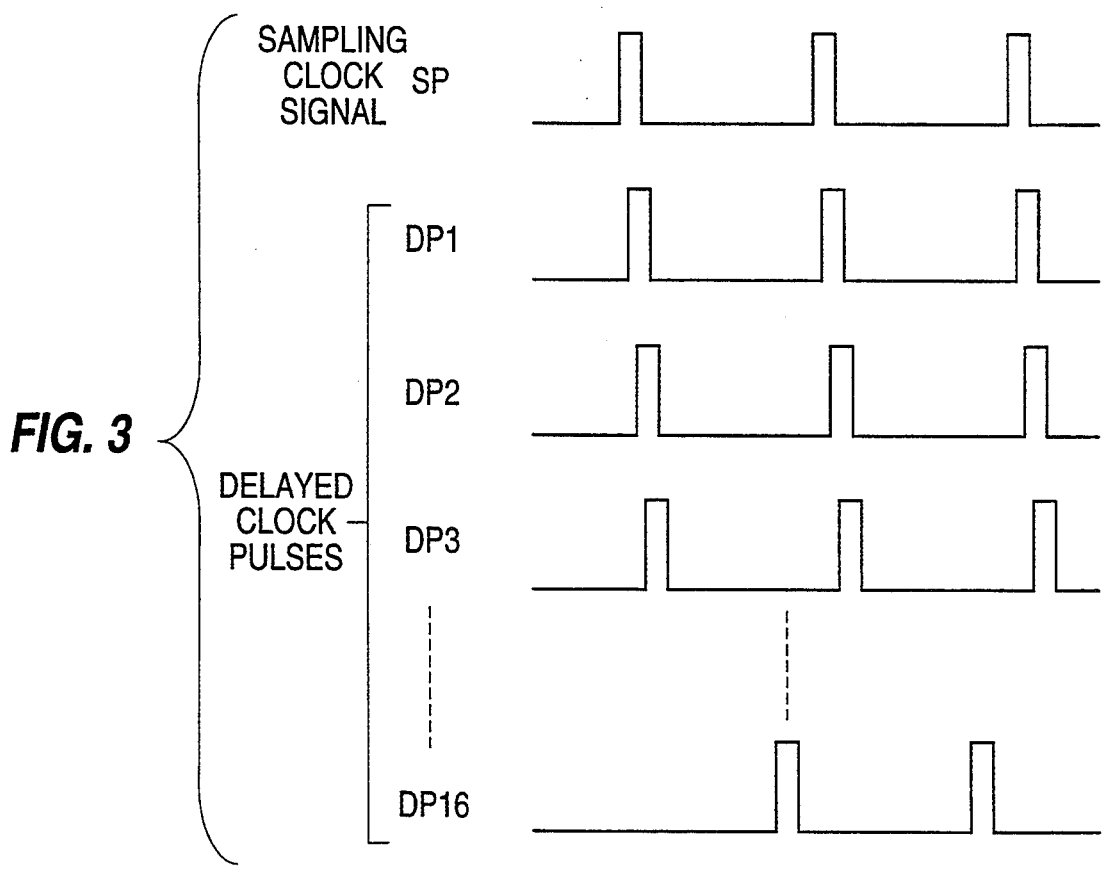
FIG. 3 is a timing chart showing the waveforms of delayed clock pulses.

In response to the vertical synchronizing signal VD from the receiver circuit 21, the oscillator circuit 22 generates a sampling clock signal SP in synchronism with the vertical synchronizing signal VD at the same frequency as the frequency of a sampling clock signal that has been generated when the video signal is outputted by the numerical control apparatus 5. The sampling clock signal SP is applied to a delay circuit which generates 16 delayed clock pulses DP1~DP16 that are out of phase with each other based on the sampling clock signal SP. The waveforms, of the delayed clock pulses DP1~DP16 are shown in FIG. 3. As can be seen from FIG. 3, the delayed clock pulses DP1~DP16 are held out of phase with the sampling clock signal SP by equal intervals.

Referring back to FIG. 1, the delayed clock pulses DP1~DP16 generated by the delay circuit 24 are sent to switching circuits (CS) 25a~25d, which are supplied with respective switching signals SS1~SS4 from the control circuit 23. The control circuit 23 sends the switching signals SS1~SS3 to the respective switching circuits 25a~25c in order to select and output one, at a time, of the delayed clock pulses DP that are out of phase with each other. In this embodiment, the delayed clock pulses DP are selected such that they are successively out of phase as they are outputted from the switching circuits 25a, 25b, 25c in the order named. Specifically, the delayed clock pulses DP outputted from the switching circuits 25a, 25b, 25c are held out of phase at certain intervals such that the delayed clock pulses DP3, DP8, DP13 or DP4, DP9, DP14 may be outputted successively from the switching circuits 25a, 25b, 25c. The control circuit 23 supplies the switching circuit 25d with the switching signal SS4 to cause it to select and output a video sampling clock pulse VSP that is finally transmitted to the image control circuit 3.

Having received the switching signals SS1~SS3, the switching circuits 25a~25c select respective different ones from the delayed clock pulses DP1~DP16, and supply the selected delayed clock pulses to the respective data latch circuits (DL) 26a~26c and respective pulse forming circuits (PM) 27a~27c. The data latch circuits 26a~26c latch the pixel data ED from the receiver circuit 21 in timed relationship to positive-going edges of any one of the selected delayed clock pulses DP1~DP16 from the switching circuits 25a~25c.

In synchronism with the selected delayed clock pulses DP from the switching circuits 25a~25c, the pulse forming circuits 27a~27c form the pixel data ED latched by the data latch circuits 26a~26c into pulses and send the pulsed pixel data ED to respective counters (CT) 28a~28c. The counters 28a~28c count the pulsed pixel data ED from the pulse forming circuits 27a~27c, and are reset in each frame period. The counts of the counters 28a~28c are sent to the control circuit 23.

When the video signal VS is transmitted for the first time from the numerical control apparatus 5, the control circuit 23 counts the pixel data ED in each frame period before displaying the pixel data ED on the panel display unit 4. A screen pattern displayed on the panel display unit when the pixel data ED is not displayed but only counted is referred to as a sampling screen pattern. The control circuit 23 confirms the counts of the counters 28a~28c in each frame period, and outputs the switching signals SS1~SS3 depending on the confirmed counts to enable the switching circuits 25a~25c to selectively output the delayed clock pulses DP.

Figure 4:
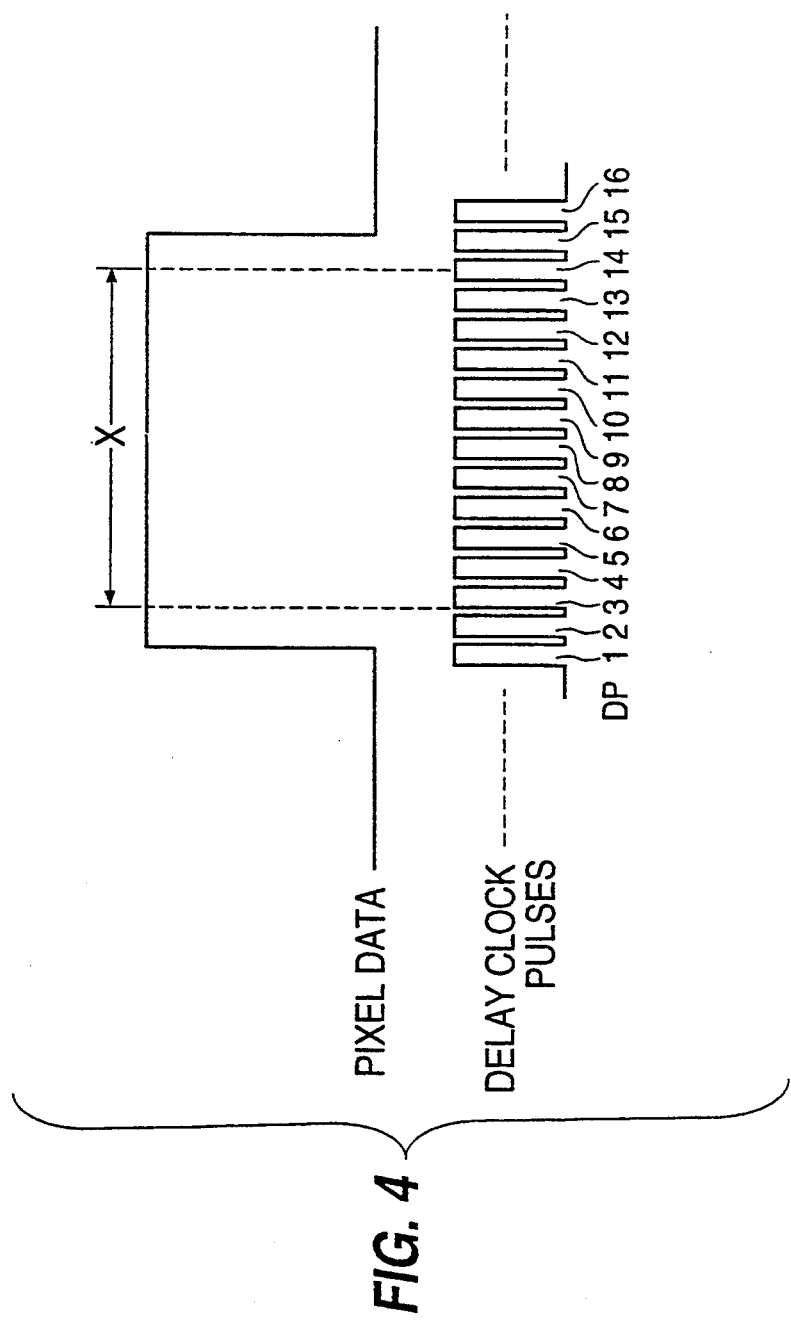
FIG. 4 is a diagram showing, by way of example, the phase relationship between pixel data and delayed clock pulses.

FIG. 4 shows, by way of example, the phase relationship between the pixel data ED and the delayed clock pulses DP1~DP16. In order to latch the pixel data ED accurately, it is desirable to employ delayed clock pulses within a predetermined range X. With the phase relationship shown in FIG. 4, the data latch circuits 26a~26c can accurately latch the pixel data ED when each of the switching circuits 25a~25c selects any one of the delayed clock pulses DP3~DP14.

If the switching circuits 25a~25c select the delayed clock pulses DP2, DP7, DP12, respectively, for example, then the data Latch circuits 26a, 26b can accurately latch the pixel data ED insofar as the delayed clock pulses has the phase relationship to the pixel data ED as shown in FIG. 4. Since, however, the delayed clock pulse DP2 is outputted near the positive-going edge of the pixel data ED, the data Latch circuit 26a may not necessarily be able to latch the pixel data ED. Therefore, if it is assumed that one frame contains 100 pulsed pixel data ED with positive-going edges, then the counters 28b, 28c can accurately count the 100 pulsed pixel data ED whereas the counter 28a can count a smaller number of pulsed pixel data ED, e.g., 80 pulsed pixel data ED.

As long as the counts are produced in the first sampling screen pattern after the video signal has started to be transmitted from the numerical control apparatus 5, the control circuit 23 stores the count of the counter 28b at this time, and outputs new switching signals SS1~SS3 to enable the switching circuits 25a~25c to output delayed clock pulses DP in a new phase pattern.

Switching to a new phase pattern is effected such that each of the three delayed clock pulses DP is shifted in phase by one pulse in one direction. Specifically, the switching circuits 25a~25c switch from outputting the delayed clock pulses DP2, DP7, DP12 to outputting the delayed clock pulses DP3, DP8, DP13 in the illustrated embodiment. Since all the delayed clock pulses DP3, DP8, DP13 are in the range X, all the counts of the counters 28a ~28c become 100.

When all the counts of the counters 28a~28c become 100, which is the count of the counter 28b in the first sampling screen pattern, the control circuit 23 outputs the switching signal SS4 to cause the switching circuit 25d to output the video sampling clock pulse VSP. The delayed clock pulse outputted by the switching circuit 25b is selected as the video sampling clock pulse VSP. Inasmuch as the switching circuit 25b outputs one of the three selected delayed clock pulses which is in intermediate phase, the pixel data ED and the video sampling clock pulse VSP can reliably be synchronized with each other when the delayed clock pulse outputted by the switching circuit 25b is selected as the video sampling clock pulse VSP.

Once the video sampling clock pulse VSP is determined, the control circuit subsequently controls the switching signals SS1, SS3 such that the counts of the counters 28a, 28b will be the same as the count of the counter 28b at all times. In this manner, the video sampling clock pulse VSP is controlled into synchronism with the pixel data ED at all times.

When the video sampling clock pulse VSP is to be determined, the counts of the counters 28a~28c may not necessarily be the same as each other provided they are equal to or greater than the count of the counter 28b in the first sampling screen pattern.

Figure 5:
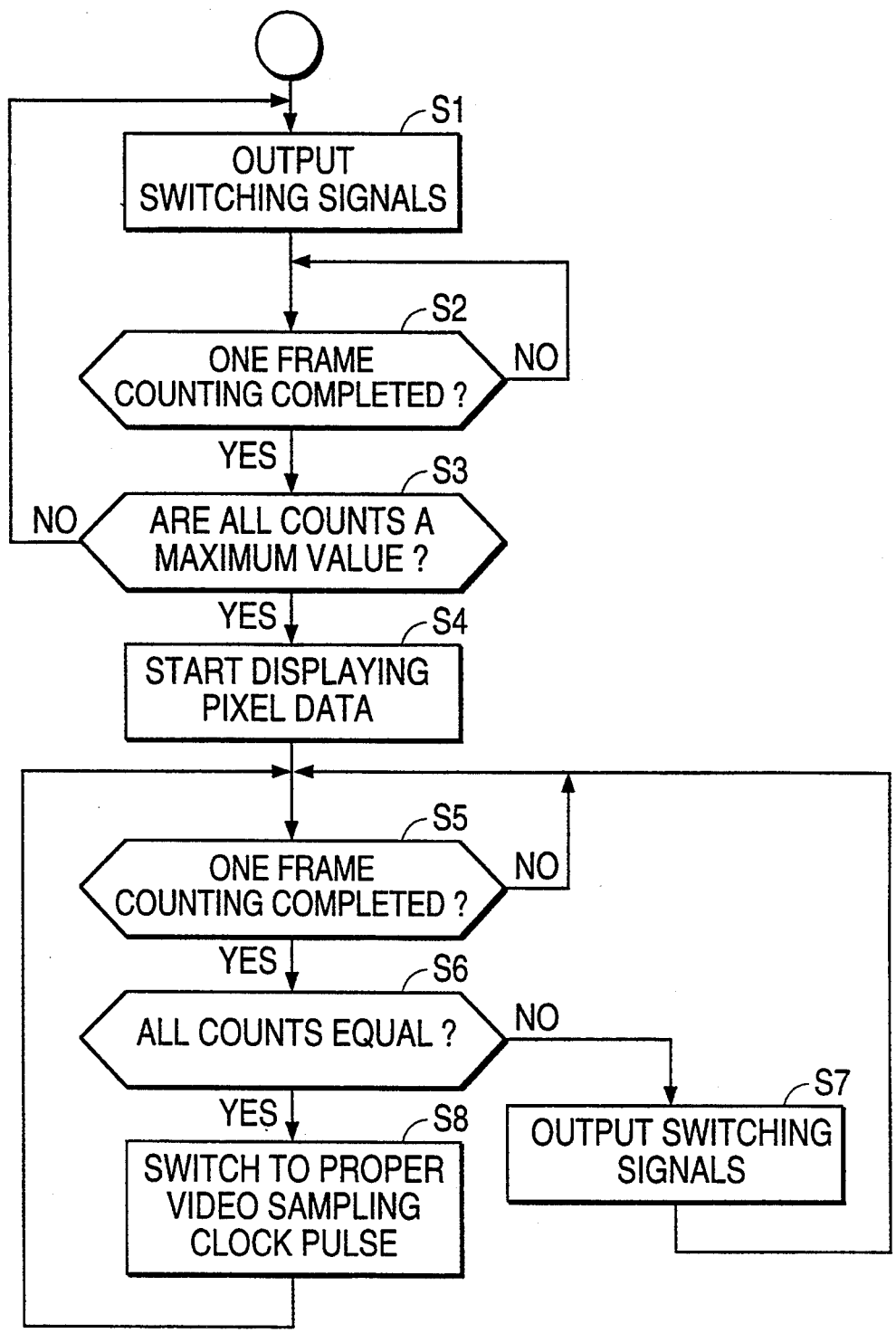
FIG. 5 is a flowchart of a control sequence carried out by a control circuit of the phase control circuit.

FIG. 5 shows a control sequence carried out by the control circuit 23. The control circuit 23 starts to execute the control sequence shown in FIG. 5 when it is supplied with a video signal immediately after a screen display operation has started.

[S1] The control circuit 23 outputs the switching signals SS1~SS3 to enable the respective switching circuits 25a~25c to output selected delayed clock pulses.

[S2] The control circuit 23 determines whether the counting of one frame of pulsed pixel data ED is completed or not. If completed, control proceeds to a step S3 and if not, then the step S2 is repeated.

[s3] The control circuit 23 determines whether all the counts of the counters 28a~28c are equal to the count of the counter 28b in the first sampling screen pattern. If equal, then control proceeds to a step S4, and if not, then control returns to the step S1.

[S4] The control circuit 23 issues the switching signal SS4 to transmit the delayed clock pulse outputted by the switching circuit 25b as the video sampling clock pulse VSP from the switching circuit 25d to the image control circuit The panel display unit 4 now starts to display the pixel data ED on its screen.

[S5] The control circuit 23 determines whether the counting of one frame of the pixel data ED from the time when the pixel data ED starts being displayed is completed or not, If completed, then control goes to a step S6, and if no, then the step S5 is repeated.

[S6] The control circuit 23 determines whether all the counts of the counters 28a~28c are equal to each other or not. If equal, then control goes to a step S8, and if not, then control goes to a step S7.

[S7] The control circuit 23 outputs the switching signals SS1~SS3 to enable the respective switching circuits 25a~25c to switch from the previous delayed clock pulses to new delayed clock pulses while keeping the phase difference unchanged therebetween.

[S8] The control circuit 23 sends the switching signal SS4 to the switching circuit 25d to switch to a proper video sampling clock pulse VSP.

In this embodiment, all the counts of the counters 28a~28c are controlled into conformity with the count of the counter 28b in the first sampling screen pattern, and the delayed clock pulse DP in intermediate phase which is outputted from the switching circuit 25b is outputted as the video sampling clock pulse VSP to the panel display unit 4. Therefore, the video sampling clock pulse VSP can be outputted which is in phase with the pixel data ED at all times. The phase control circuit 2 can be operated easily because the video sampling clock pulse VSP is automatically selected based on the switching signals SS1~SS4 from the control circuit 23.

While the pulsed pixel data ED are counted by selecting three delayed clock pulses DP in the above embodiment, four or more delayed clock pulses may be selected if necessary.

Though the video sampling clock pulse VSP is synchronized with the pixel data ED in each frame based on the counts of the counters 28a~28c in the above embodiment, the synchronization may be achieved per horizontal synchronizing signal or a plurality of horizontal synchronizing signals.

With the present invention, as described above, pulsed pixel data are counted based on a plurality of sampling clock pulses that are out of phase with each other, and when all counts reach a predetermined value, one of the sampling clock pulses is selected and outputted as a video sampling clock pulse to the display unit. Consequently, the video sampling clock that is reliably held in phase with the pixel data is automatically selected. The phase control circuit 2 can thus be operated easily.

I claim:

1. A phase control circuit for controlling the phase of a video signal and sampling clock signal, comprising:
   sampling clock pulse output means for outputting a plurality of sampling clock pulses which are out of phase with each other;
   a plurality of sampling clock pulse switching means for selecting and outputting respective sampling clock pulses which are out of phase with each other from said plurality of sampling clock pulses every time a switching signal is supplied thereto;
   video sampling clock pulse output means for selecting one, at a time, of said plurality of sampling clock pulses and outputting the selected sampling clock pulse as a video sampling clock pulse to a display unit based on a video sampling clock pulse determining signal;
   a plurality of pixel data holding means connected respectively to said plurality of sampling clock pulse switching means, for holding pixel data in response to said sampling clock pulses outputted by said sampling clock pulse switching means, respectively;
   a plurality of pixel data counting means for counting the pixel data held by said pixel data holding means, respectively; and
   phase control means for confirming counts produced by said pixel data counting means in each of predetermined periods, outputting said video sampling clock pulse determining signal to said video sampling clock pulse output means if all the counts are equal to or greater than a predetermined value, and outputting new switching signals to said sampling clock pulse switching means, respectively, if any one of the counts is not equal to or greater than the predetermined value.

2. A phase control circuit according to claim 1, where said phase control means comprises means for outputting said sampling clock pulse determining signal to said video sampling clock pulse output means to select one, which is in substantially intermediate phase, of the sampling clock pulses selected and outputted by said plurality of sampling clock pulse switching means, respectively.

3. A phase control circuit according to claim 1, wherein said predetermined value is a largest one of the counts which are produced by said pixel data counting means for the first time after the video signal has been transmitted.

* * * * *

UNITED STATES PATENT AND TRADEMARK OFFICE
CERTIFICATE OF CORRECTION

PATENT NO. : 5,396,295
DATED : March 7, 1995
INVENTOR(S) : S. Furuta

It is certified that error appears in the above-indentified patent and that said Letters Patent is hereby corrected as shown below:

Title page, item [56] U.S. Patent Documents delete "0006985" and insert --60-6985-- delete "0122688" and insert --61-122688-- delete "0150970" and insert --62-150970-- delete "0237689" and insert --1-237689-- delete "0130593" and insert --2-130593--

[57] Abstract line 8, delete "(23)," and insert --(23).-- line 17, delete "unit all" and insert --unit if all--

Col. 2., line 10, after "system" insert --is--

Col. 3, line 3, delete "the sampling" and insert --the video sampling--

Col. 3, line 61, after "circuit" insert --23.--

Col. 4, line 6, delete "circuit which" and insert --circuit 24, which--

UNITED STATES PATENT AND TRADEMARK OFFICE
CERTIFICATE OF CORRECTION

PATENT NO. : 5,396,295  
DATED : March 7, 1995  
INVENTOR(S) : S. Furuta

It is certified that error appears in the above-indentified patent and that said Letters Patent is hereby corrected as shown below:

Col. 4, line 8, after "other" insert --,--

Col. 4, line 9, delete "," after "waveforms"

Col. 4, line 60, delete "unit when" and insert --unit 4 when--

Col. 5, line 10, delete "Latch" and insert --latch--

Col. 5, line 15, delete "Latch" and insert --latch--

Col. 5, line 55, insert --23-- after "circuit"

Col. 6, line 10, delete "S3" and insert --S3,--

Col. 6, line 11, delete "s3" and insert --S3--

Col. 6, line 20, insert --3.-- after "circuit"

Col. 6, line 25, delete "not," and insert --not.--

UNITED STATES PATENT AND TRADEMARK OFFICE
CERTIFICATE OF CORRECTION

PATENT NO. : 5,396,295

DATED : March 7, 1995

INVENTOR(S) : S. Furuta

It is certified that error appears in the above-indentified patent and that said Letters Patent is hereby corrected as shown below:

Column 7, line 6, delete "and sampling" and insert —and a sampling—

Signed and Sealed this

Twenty-ninth Day of August, 1995

Attest:

BRUCE LEHMAN

Attesting Officer   Commissioner of Patents and Trademarks